United States Patent
Olivier, III et al.

(10) Patent No.: US 9,001,190 B2
(45) Date of Patent: Apr. 7, 2015

(54) COMPUTER VISION SYSTEM AND METHOD USING A DEPTH SENSOR

(75) Inventors: Charles F. Olivier, III, Bothell, WA (US); Jean Sebastien Fouillade, Redmond, WA (US); Ashley Feniello, Duvall, WA (US); Jordan Correa, Lynnwood, WA (US); Russell Sanchez, Seattle, WA (US); Malek Chalabi, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 363 days.

(21) Appl. No.: 13/175,967

(22) Filed: Jul. 5, 2011

(65) Prior Publication Data

US 2013/0010066 A1 Jan. 10, 2013

(51) Int. Cl.
| | | |
|---|---|---|
| H04N 13/02 | (2006.01) | |
| B25J 9/16 | (2006.01) | |
| G01S 17/89 | (2006.01) | |
| G01B 11/25 | (2006.01) | |

(52) U.S. Cl.
CPC .......... *H04N 13/0271* (2013.01); *B25J 9/1697* (2013.01); *G01S 17/89* (2013.01); *B25J 9/1689* (2013.01); *G01B 11/25* (2013.01)

(58) Field of Classification Search
CPC . H04N 13/0271; H04N 13/271; B25J 9/1697; B25J 9/1689; G01S 17/89; G01B 11/25
USPC .......... 348/46, 211.1; 382/154, 118; 315/152; 386/239
See application file for complete search history.

(56) References Cited

U.S. PATENT DOCUMENTS

| | | | |
|---|---|---|---|
| 4,700,224 A * | 10/1987 | Miyasaka et al. | 382/152 |
| 6,992,275 B1 | 1/2006 | Knapp | |
| 7,372,977 B2 | 5/2008 | Fujimura et al. | |
| 8,355,565 B1 * | 1/2013 | Yang et al. | 382/154 |
| 2002/0146169 A1 * | 10/2002 | Sukthankar et al. | 382/170 |
| 2003/0043290 A1 * | 3/2003 | Sasaki | 348/345 |
| 2005/0174434 A1 * | 8/2005 | Chang et al. | 348/211.1 |
| 2006/0061569 A1 * | 3/2006 | Yamada | 345/422 |
| 2006/0132604 A1 * | 6/2006 | Lao et al. | 348/148 |
| 2006/0177097 A1 | 8/2006 | Fujimura et al. | |
| 2006/0221250 A1 | 10/2006 | Rossbach et al. | |
| 2007/0076187 A1 * | 4/2007 | Goris et al. | 356/4.03 |
| 2007/0122007 A1 * | 5/2007 | Austin et al. | 382/118 |

(Continued)

OTHER PUBLICATIONS

Khurshid, et al., "Military Robots—A Glimpse from Today and Tomorrow", Retrieved at <<http://ieeexplore.ieee.org/stamp/stamp.jsp?tp=&arnumber=1468925>>, 8th Control, Automation, Robotics and Vision Conference, Dec. 6-9, 2004, pp. 771-777.

Mullins, et al., "OzBot and Haptics—Remote Surveillance to Physical Presence", Retrieved at <<http://www.deakin.edu.au/dro/eserv/DU:30029263/nahavandi-ozbotandhaptics-2009.pdf>>, In Defence, Security, and Sensing Displays, Robotics, and Space Technologies, Apr. 13-17, 2009, pp. 9.

(Continued)

*Primary Examiner* — Richard Torrente
*Assistant Examiner* — Joseph Suh
(74) *Attorney, Agent, or Firm* — Steve Wight; Peter Taylor; Micky Minhas

(57) ABSTRACT

A robot is provided that includes a processor executing instructions that generate an image. The robot also includes a depth sensor that captures depth data about an environment of the robot. Additionally, the robot includes a software component executed by the processor configured to generate a depth map of the environment based on the depth data. The software component is also configured to generate the image based on the depth map and red-green-blue (RGB) data about the environment.

20 Claims, 6 Drawing Sheets

(56) References Cited

U.S. PATENT DOCUMENTS

| | | | |
|---|---|---|---|
| 2007/0249967 A1* | 10/2007 | Buly et al. | 600/595 |
| 2008/0298789 A1* | 12/2008 | Ohki | 396/52 |
| 2009/0067715 A1* | 3/2009 | Spruck | 382/172 |
| 2009/0161206 A1* | 6/2009 | Edwards | 359/385 |
| 2010/0128034 A1* | 5/2010 | Han et al. | 345/422 |
| 2010/0195898 A1* | 8/2010 | Bang et al. | 382/154 |
| 2010/0295455 A1* | 11/2010 | Reed | 315/152 |
| 2010/0296703 A1* | 11/2010 | Marti | 382/103 |
| 2010/0315505 A1* | 12/2010 | Michalke et al. | 348/118 |
| 2011/0026833 A1 | 2/2011 | Sugino et al. | |
| 2011/0140873 A1* | 6/2011 | Stahlin et al. | 340/438 |
| 2011/0211749 A1* | 9/2011 | Tan et al. | 382/154 |
| 2011/0211754 A1* | 9/2011 | Litvak et al. | 382/165 |
| 2011/0235992 A1* | 9/2011 | Mihara | 386/239 |
| 2011/0296353 A1* | 12/2011 | Ahmed et al. | 715/848 |
| 2012/0075534 A1* | 3/2012 | Katz et al. | 348/602 |
| 2012/0320157 A1* | 12/2012 | Junuzovic et al. | 348/46 |
| 2013/0022262 A1* | 1/2013 | Baele et al. | 382/154 |

OTHER PUBLICATIONS

Chin, et al., "Experimental Vehicle Platform for Pedestrian Detection", Retrieved at <<http://citeseerx.ist.psu.edu/viewdoc/download?doi=10.1.1.91.6122&rep=rep1&type=pdf>>, 2006, pp. 74.

"Kinect Plus Night-Vision Goggles Equals Crazy Headtrip", Retrieved at <<http://www.escapistmagazine.com/news/view/105046-Kinect-Plus-Night-Vision-Goggles-Equals-Crazy-Headtrip>>, Mar. 22, 2011, pp. 4.

"Night vision", Retrieved at <<http://en.wikipedia.org/wiki/Night_vision>>, Jun. 30, 2011, pp. 15.

Fogarty, Kevin., "FCS robot gets ready for battlefield", Retrieved at <<http://defensesystems.com/Articles/2008/08/FCS-robot-gets-ready-for-battlefield.aspx>>, Aug. 11, 2008, pp. 4.

* cited by examiner

200

400

COMPUTER VISION SYSTEM AND METHOD USING A DEPTH SENSOR

BACKGROUND

Active infrared night vision is commonly found in commercial, residential and government security applications, providing effective night time imaging under low light conditions. Active infrared night vision typically combines infrared illumination in the spectral range 700-1000 nanometers (nm), and records the resultant image with CCD cameras sensitive to this spectral range. This spectral range is just below the visible spectrum of the human eye. Accordingly, a scene that may appear uniformly dark to a human eye, may instead appear as a shaded monochrome image on a display device.

SUMMARY

The following is a brief summary of subject matter that is described in greater detail herein. This summary is not intended to be limiting as to the scope of the claims. It is intended to neither identify key or critical elements of the claimed subject matter nor delineate the scope of the subject innovation. Its sole purpose is to present some concepts of the claimed subject matter in a simplified form as a prelude to the more detailed description that is presented later.

The claimed subject matter generally provides a robot that includes a processor executing instructions that generate the image. The robot also includes a depth sensor that captures depth data about an environment of the robot. Additionally, the robot includes a software component executed by the processor configured to generate a depth map of the environment based on the depth data. The software component is also configured to generate the image based on the depth map and red-green-blue (RGB) data about the environment.

Another embodiment of the claimed subject matter relates to a mobile device. The mobile device includes a processor, a depth sensor, a camera, and a software component. The depth sensor is configured to capture depth data about an environment of the robot. The camera is configured to capture RGB data about the environment. The software component is executable by the processor. Further, the software component is configured to direct the processor to generate a depth map of the environment based on the depth data. The software component directs the processor to generate an image based on the depth map and the RGB data.

Yet another embodiment of the claimed subject matter relates to a method for generating an image. The method includes generating a depth map of an environment of the robot. The method also includes capturing RGB data about the environment. Additionally, the method includes determining that an illumination level falls below a specified threshold. The method further includes generating an image based on the depth map and the RGB data about the environment. The image is generated in response to determining that the illumination level falls below the specified threshold.

DETAILED DESCRIPTION

Figure 1:
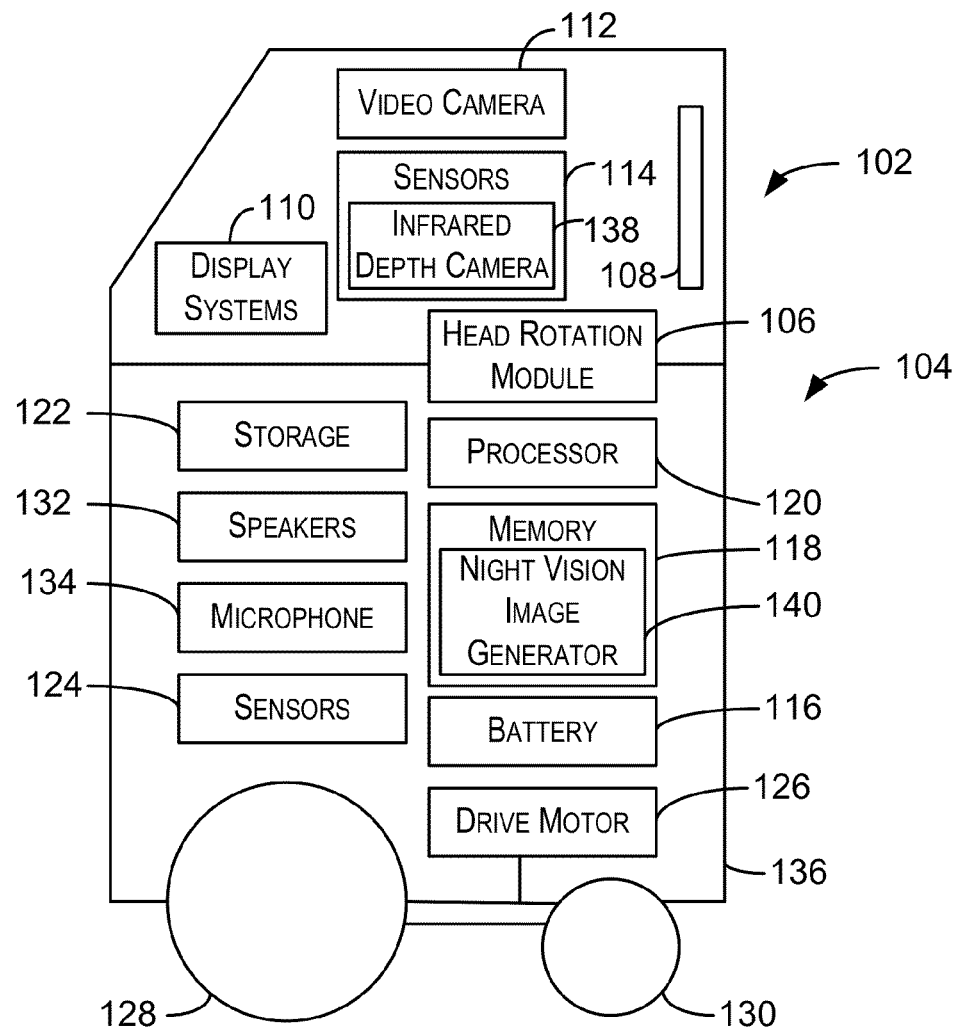
FIG. 1 is a block diagram of a robotic device or robot in accordance with the claimed subject matter.

The claimed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the claimed subject matter may be practiced without these specific details. In other instances, well-known structures and devices are shown in block diagram form in order to facilitate describing the subject innovation.

As utilized herein, terms "component," "system," "client" and the like are intended to refer to a computer-related entity, either hardware, software (e.g., in execution), and/or firmware, or a combination thereof. For example, a component can be a process running on a processor, an object, an executable, a program, a function, a library, a subroutine, and/or a computer or a combination of software and hardware.

By way of illustration, both an application running on a server and the server can be a component. One or more components can reside within a process and a component can be localized on one computer and/or distributed between two or more computers. The term "processor" is generally understood to refer to a hardware component, such as a processing unit of a computer system.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any non-transitory computer-readable device, or media.

Non-transitory computer-readable storage media can include but are not limited to magnetic storage devices (e.g., hard disk, floppy disk, and magnetic strips, among others), optical disks (e.g., compact disk (CD), and digital versatile disk (DVD), among others), smart cards, and flash memory devices (e.g., card, stick, and key drive, among others). In contrast, computer-readable media generally (i.e., not necessarily storage media) may additionally include communication media such as transmission media for wireless signals and the like.

Of course, those skilled in the art will recognize many modifications may be made to this configuration without departing from the scope or spirit of the claimed subject matter. Moreover, the word "exemplary" is used herein to mean serving as an example, instance, or illustration. Any aspect or design described herein as "exemplary" is not necessarily to be construed as preferred or advantageous over other aspects or designs.

Where lighting in the environment of a robot, or other mobile device, is inadequate, depth data collected via an infrared depth camera may be used to produce an image, and a video of the environment. The video may be transmitted to a remote user. In one embodiment, the available red-green-blue (RGB) data may be used to improve the quality of an image generated this way. This may enable the remote user to operate the robot in, and view, a low-light environment. Additionally, this may be done without attracting attention to the robot in, for example, a security application.

FIG. 1 is a block diagram of a robotic device or robot 100 in accordance with the claimed subject matter. The robot 100 may be capable of communicating with a remotely-located computing device by way of a network connection. The robot 100 is an electro-mechanical machine that includes computer hardware and software that causes the robot 100 to perform functions independently and without assistance from a user. The robot 100 can include a head portion 102 and a body portion 104, wherein the head portion 102 is movable with respect to the body portion 104. Additionally, the robot 100 can include a head rotation module 106 that operates to couple the head portion 102 with the body portion 104, wherein the head rotation module 106 can include one or more motors that can cause the head portion 102 to rotate with respect to the body portion 104. As an example, the head rotation module 106 may rotate the head portion 102 with respect to the body portion 104 up to 45° in any direction. In another example, the head rotation module 106 can allow the head portion 102 to rotate 90° in relation to the body portion 104. In still yet another example, the head rotation module 106 can facilitate 180° rotation of the head portion 102, with respect to the body portion 104. The head rotation module 106 can facilitate rotation of the head portion 102 with respect to the body portion 102 in either angular direction.

The head portion 102 may include an antenna 108 that is configured to receive and transmit wireless signals. For instance, the antenna 108 can be configured to receive and transmit Wi-Fi signals, Bluetooth signals, infrared (IR) signals, sonar signals, radio frequency (RF), signals or other suitable signals. The antenna 108 can be configured to receive and transmit data to and from a cellular tower. Further, the robot 100 may communicate with a remotely-located computing device (not shown) using the antenna 108.

The head portion 102 of the robot 100 also includes one or more display systems 110 configured to display information to an individual that is proximate to the robot 100. A video camera 112 disposed on the head portion 102 may be configured to capture images and video of an environment of the robot 100. For example, the video camera 112 can be a high definition video camera that facilitates capturing video data that is in, for instance, 720p format, 720i format, 1080p format, 1080i format, or other suitable high definition video format. The video camera 112 may also be configured to capture relatively low resolution data in a format that is suitable for transmission to the remote computing device by way of the antenna 108. As the video camera 112 is mounted in the head portion 102 of the robot 100, through utilization of the head rotation module 106, the video camera 112 can be configured to capture live video data of a relatively large portion of an environment of the robot 100. The video camera 112 may provide red green blue (RGB) data about the environment.

The robot 100 may further include one or more sensors 114. The sensors 114 may include any type of sensor that can aid the robot 100 in performing autonomous or semi-autonomous navigation. For example, these sensors 114 may include a depth sensor, an infrared (IR) sensor, a camera, a cliff sensor that is configured to detect a drop-off in elevation proximate to the robot 100, a GPS sensor, an accelerometer, a gyroscope, or other suitable sensor type. The sensors 114 may also include an infrared (IR) depth sensor. It may be desirable to obtain user consent before releasing certain types of data gathered by the sensors 114, such as data relating to user privacy. Depth data is typically collected for automatic navigation and skeleton tracking. However, during low-light and no-light conditions, the depth data may be used to generate images, and video, of the environment. Additionally, such images and video may be enhanced with available RGB data captured by the video camera 112.

The body portion 104 of the robot 100 may include a battery 116 that is operable to provide power to other modules in the robot 100. The battery 116 may be, for instance, a rechargeable battery. In such a case, the robot 100 may include an interface that allows the robot 100 to be coupled to a power source, such that the battery 116 can be recharged.

The body portion 104 of the robot 100 can also include one or more computer-readable storage media, such as memory 118. The memory 118 includes a night vision image generator 140. The night vision image generator 140 may generate images, and video, of the robot's environment during low-light and no-light conditions. The generated images may be based on both depth data and available RGB data. A processor 120, such as a microprocessor, may also be included in the body portion 104. As will be described in greater detail below, the memory 118 can include a number of components that are executable by the processor 120, wherein execution of such components facilitates controlling and/or communicating with one or more of the other systems and modules of the robot. The processor 120 can be in communication with the other systems and modules of the robot 100 by way of any suitable interface, such as a bus hosted by a motherboard. In an embodiment, the processor 120 functions as the "brains" of the robot 100. For instance, the processor 120 may be utilized to process data received from a remote computing device as well as other systems and modules of the robot 100 and cause the robot 100 to perform in a manner that is desired by a user of such robot 100. The robot may also include a storage 122, storing data, applications, etc., which may be written to, and from, the memory 118. In one embodiment, the storage 122 may include one or more non-volatile computer-readable media.

The body portion 104 of the robot 100 can further include one or more sensors 124, wherein such sensors 124 can include any suitable sensor that can output data that can be utilized in connection with autonomous or semi-autonomous navigation. For example, the sensors 124 may include sonar sensors, location sensors, infrared sensors, a camera, a cliff sensor, and/or the like. Data that is captured by the sensors 124 and the sensors 114 can be provided to the processor 120, which can process the data and autonomously navigate the robot 100 based at least in part upon the data output.

A drive motor 126 may be disposed in the body portion 104 of the robot 100. The drive motor 126 may be operable to drive wheels 128 and/or 130 of the robot 100. For example, the wheel 128 can be a driving wheel while the wheel 130 can be a steering wheel that can act to pivot to change the orientation of the robot 100. Additionally, each of the wheels 128 and 130 can have a steering mechanism to change the orientation of the robot 100. Furthermore, while the drive motor 126 is shown as driving both of the wheels 128 and 130, it is to be understood that the drive motor 126 may drive only one of the wheels 128 or 130 while another drive motor can drive the other of the wheels 128 or 130. Upon receipt of data from the sensors 114 and 124 and/or receipt of commands from the remote computing device (for example, received by way of the antenna 108), the processor 120 can transmit signals to the head rotation module 106 and/or the drive motor 126 to control orientation of the head portion 102 with respect to the body portion 104, and/or to control the orientation and position of the robot 100.

The body portion 104 of the robot 100 can further include speakers 132 and a microphone 134. Data captured by way of the microphone 134 can be transmitted to the remote computing device by way of the antenna 108. Accordingly, a user at the remote computing device can receive a real-time audio/video feed and may experience the environment of the robot 100. The speakers 132 can be employed to output audio data to one or more individuals that are proximate to the robot 100. This audio information can be a multimedia file that is retained in the memory 118 of the robot 100, audio files received by the robot 100 from the remote computing device by way of the antenna 108, real-time audio data from a webcam or microphone at the remote computing device, etc. The components described above may be enclosed within a robot skin 136.

While the robot 100 has been shown in a particular configuration and with particular modules included therein, it is to be understood that the robot can be configured in a variety of different manners, and these configurations are contemplated and are intended to fall within the scope of the hereto-appended claims. For instance, the head rotation module 106 can be configured with a tilt motor so that the head portion 102 of the robot 100 can tilt in a vertical direction. Alternatively, the robot 100 may not include two separate portions, but may include a single unified body, wherein the robot body can be turned to allow the capture of video data by way of the video camera 112. In still yet another embodiment, the robot 100 can have a unified body structure, but the video camera 112 can have a motor, such as a servomotor, associated therewith that allows the video camera 112 to alter position to obtain different views of an environment. Modules that are shown to be in the body portion 104 can be placed in the head portion 102 of the robot 100, and vice versa. It is also to be understood that the robot 100 has been provided solely for the purposes of explanation and is not intended to be limiting as to the scope of the hereto-appended claims.

It is noted that embodiments of the claimed subject matter may include the robot 100 or another mobile device. Another mobile device may share many of the same components as the robot 100, such as the memory 118, processor 120, video camera 112, infrared depth camera 138, and night vision image generator 140.

Figure 2:
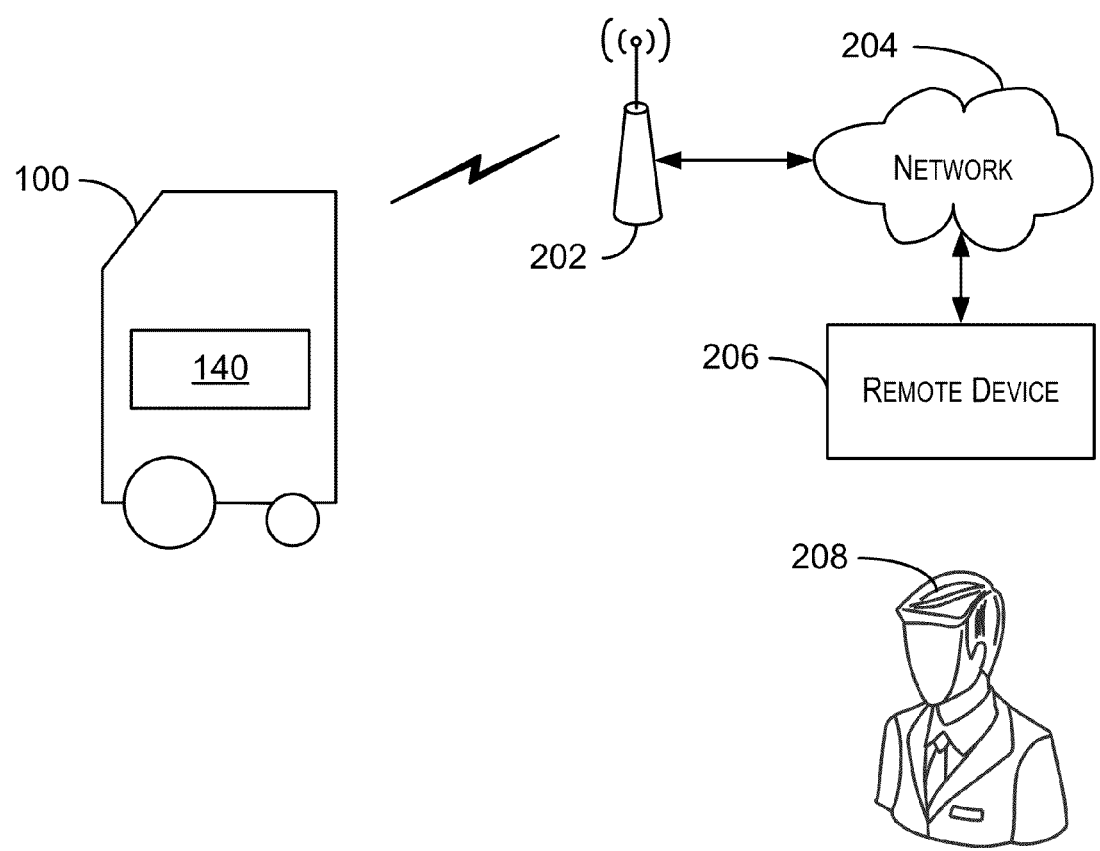
FIG. 2 is a block diagram of an environment that facilitates communications between the robot and one or more remote devices, in accordance with the claimed subject matter.

FIG. 2 is a block diagram of an environment 200 that facilitates communication between the robot 100 and one or more remote devices 206, in accordance with the claimed subject matter. More particularly, the environment 200 includes a wireless access point 202, a network 204, and a remote device 206. The robot 100 is configured to receive and transmit data wirelessly via antenna 108. In an exemplary embodiment, the robot 100 initializes on power up and communicates with a wireless access point 202 and establishes its presence with the access point 202. The robot 100 may then obtain a connection to one or more networks 204 by way of the access point 202. For example, the networks 204 may include a cellular network, the Internet, a proprietary network such as an intranet, or other suitable network.

Each of the remote devices 206 can have respective applications executing thereon that facilitate communication with the robot 100 by way of the network 204. For example, and as will be understood by one of ordinary skill in the art, a communication channel can be established between the remote device 206 and the robot 100 by way of the network 204 through various actions such as handshaking, authentication, and other similar methods. The remote devices 206 may include a desktop computer, a laptop computer, a mobile telephone or smart phone, a mobile multimedia device, a gaming console, or other suitable remote device. The remote device 206 can include or have associated therewith a display or touch screen (not shown) that can present data, images, and other information, and provide a graphical user interface to a user 208 pertaining to navigation, control, and the environment surrounding the robot 100. For example, the robot 100 can transmit a live audio, or video, feed of its environment to the remote device 206 by way of the network 204, and the remote device 206 can present the feed to the user 208. Additionally, during low-light and no-light conditions, the night vision image generator 140 may send images and video generated from depth data collected from the IR depth sensor 138, and available RGB data.

As a further example, the robot 100 can transmit information relating to the environment of robot 100 based on data from sensors 114 and 122 received by the processor 120, including temperature, humidity and other data relating to the environment of the robot 100. As a still further example, the robot 100 can also transmit information relating to its movement, current location, direction and speed of movement, next destination, and other information relating to location and movement of the robot 100. The user 208 can transmit a variety of commands, including commands related to generating images and video based on depth information of the robot's environment. The generated images and video may be communicated to the remote device 206.

In an exemplary embodiment, the user 208 and the remote device 206 may be in a location that is remote from the robot 100, and the user 208 can utilize the robot 100 to explore an environment of the robot 100. Exemplary purposes for which the user 208 may wish to control the robot 100 remotely include instructing the robot 100 to move to a certain location to provide the user 208 via the remote device 206 with video and/or audio feeds from that location, to determine the temperature and/or humidity at that location, and to check the status of any systems operating in the environment of robot 100, such as heating and ventilation or other environmental systems.

Figure 3A:
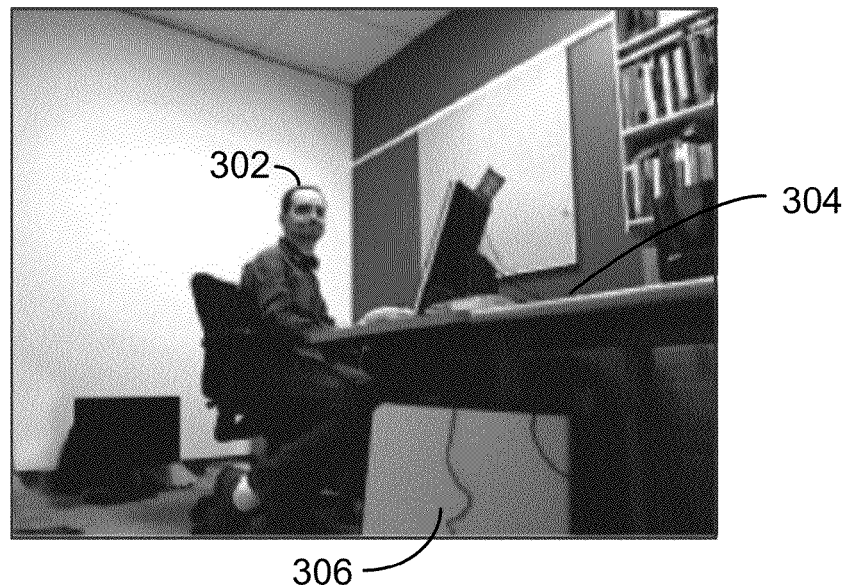
FIG. 3A is an example image in accordance with the claimed subject matter.
Figure 3B:
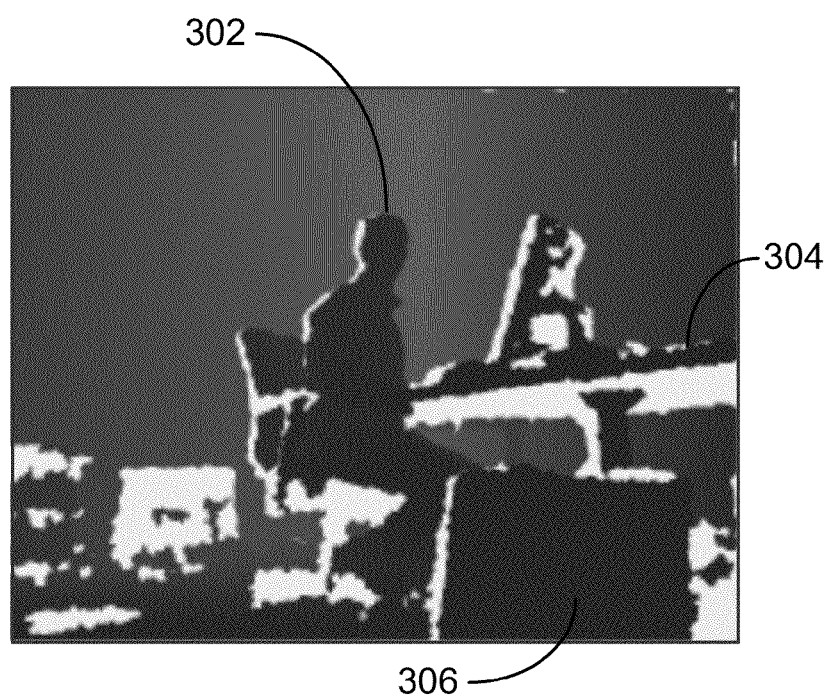
FIG. 3B is an example of depth data determined in a well-lit environment.
Figure 3C:
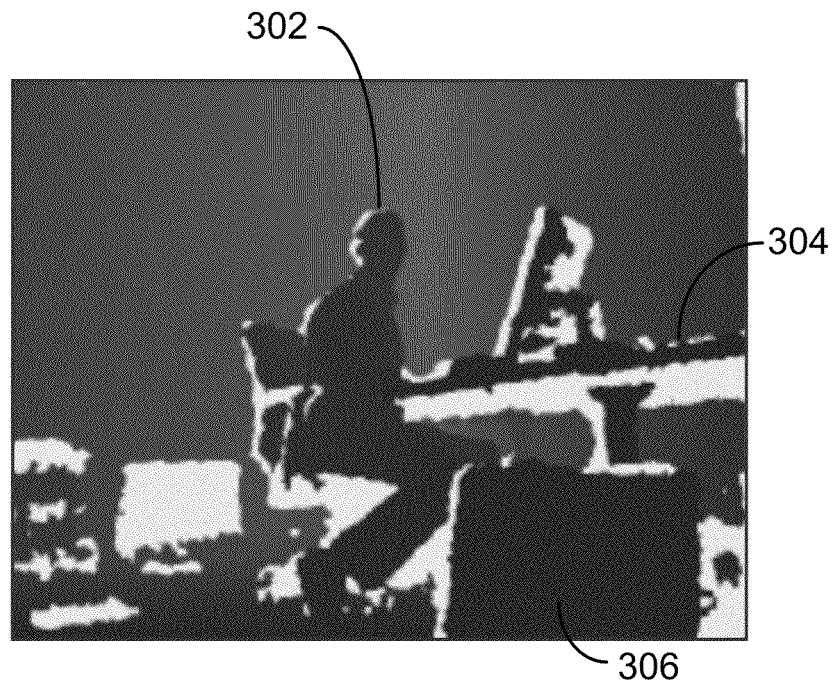
FIG. 3C is an example of depth data determined in low-light conditions.
Figure 3D:
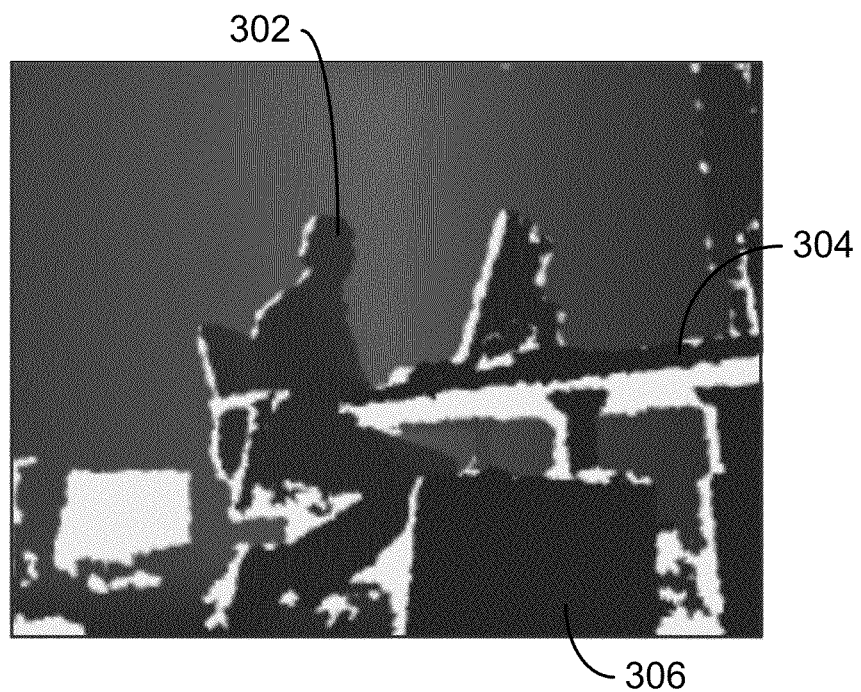
FIG. 3D is an example of depth data determined in no-light conditions.

FIG. 3A is an example image 300A in accordance with the claimed subject matter. As shown, the image 300A includes various objects in an office environment. The objects include a worker 302, a desk 304, and a computer 306. The example image 300A may be rendered from RGB data captured by the video camera 112 in a well-lit environment. In a low-light, or no-light, condition, available RGB data may be limited. As such, generating an image that includes all the details of the image 300A may be challenging. In contrast, FIG. 3B is an example of depth data determined in the well-lit environment. Using the depth data, it is possible to identify the worker 302, desk 304, and computer 306. The depth may be determined using measures of infrared light, meaning that depth may be determined without regard to lighting conditions of the environment. For example, FIGS. 3C-3D are examples of depth data determined in low-light and no-light conditions, respectively. In one embodiment, a depth map may be generated by using infrared laser scans, and a combination of time-of-flight and structured light deformations. Lighting conditions may have limited effect on depth maps generated in this manner. From the depth maps, an image of the environment may be generated. The depth maps may be generated while the robot 100 is recording video of its environment for the remote user 208. The video may be sent to the remote device 206 as a stream of generated images.

Figure 4:
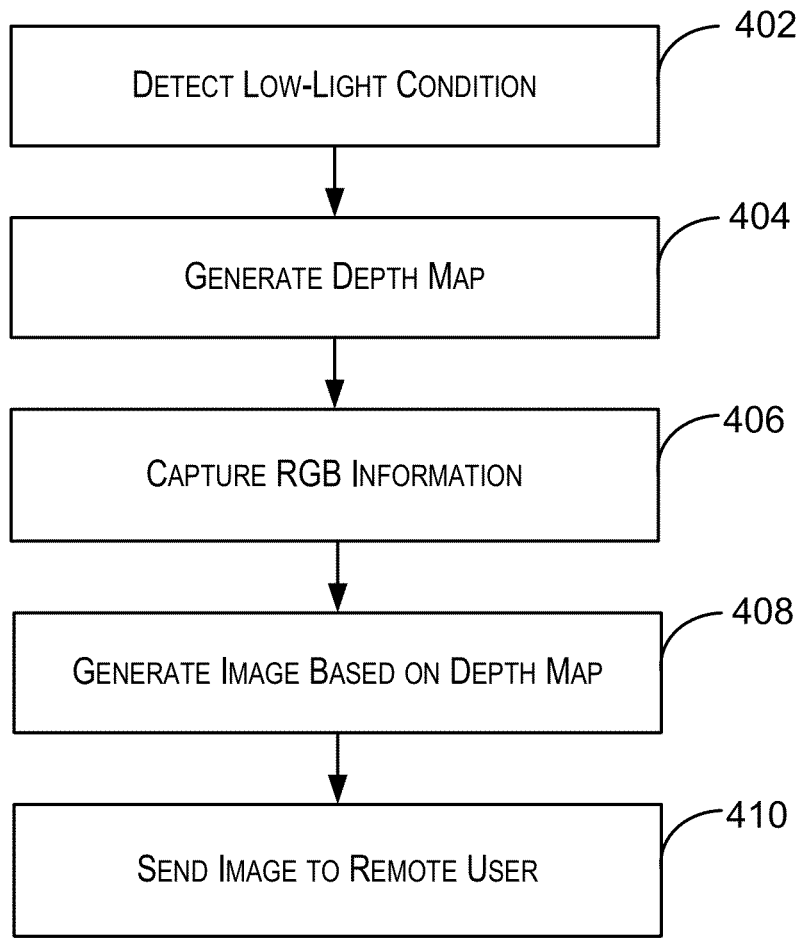
FIG. 4 is a process flow diagram of a method of generating an image in accordance with the claimed subject matter.

FIGS. 3C-3D are examples of depth data determined in low-light and no-light conditions, respectively. FIG. 4 is a process flow diagram of a method 400 of generating an image in accordance with the claimed subject matter. The method may be performed during a telepresence session with the remote user 208 and the robot 100 or other mobile device. This method may be useful when the remote user 208 is teleoperating the robot 100 in low-light or no-light conditions. The method 400 begins at block 402, where the robot 100 may detect a low-light condition. In one embodiment, the robot 100 may switch automatically to a night vision setting when the illumination in the robot's environment drops below a specified level.

At block 404, a depth map may be generated from depth data collected about the robot's environment. A depth camera on the robot 100 may illuminate the robot's environment with infrared laser. The depth camera may then capture visual depth data from the reflected infrared laser. The depth data may be determined using a time-of-flight (TOF) method. The TOF method typically measures the length of an optical path over a range of wavelengths. The depth may also be determined using structured light deformations. Structured-light deformation is a method where a pattern of light illuminates a subject. Depth, and other characteristics, may then be determined based on the deformation of the pattern by the subject.

At block 404, the video camera 112 may capture any available RGB data. At block 408, an image may be generated based on the depth map. In one embodiment, an application in memory may convert depth data into image data by associating color intensity with depth value. In this way, natural illumination may be simulated according to the inverse-square law, $$\text{illumination} = \frac{1}{\text{depth}^2}.$$

The image may also include the available RGB data captured by the video camera 112. The RGB data may be added according to the equalities shown in Equation 1:

$$R = \frac{r + 2i}{3};$$
$$G = \frac{g + 2i}{3};$$
$$B = \frac{b + 2i}{3}$$

EQUATION 1 where, i represents illumination calculated from depth data as a gray scale image with all identical channels. The R, G, B data may be calculated on a per-channel basis, where r, g, b represent the channels for a semi-transparent RGB image. Calculating RGB values in this way represents two-thirds depth-based illumination. It is noted that one third formulations are merely used an example. Other variations may be specified by a user, e.g., $\frac{1}{10}$, $\frac{99}{100}$, etc.

At block 410 of FIG. 4, the image may be sent to the remote user 208. In one embodiment, blocks 404-410 may be repeated. In this way, the generated images may be streamed together to form a video. The received images, or video, may enable the remote user 208 to navigate the robot 100 in its environment.

Figure 5:
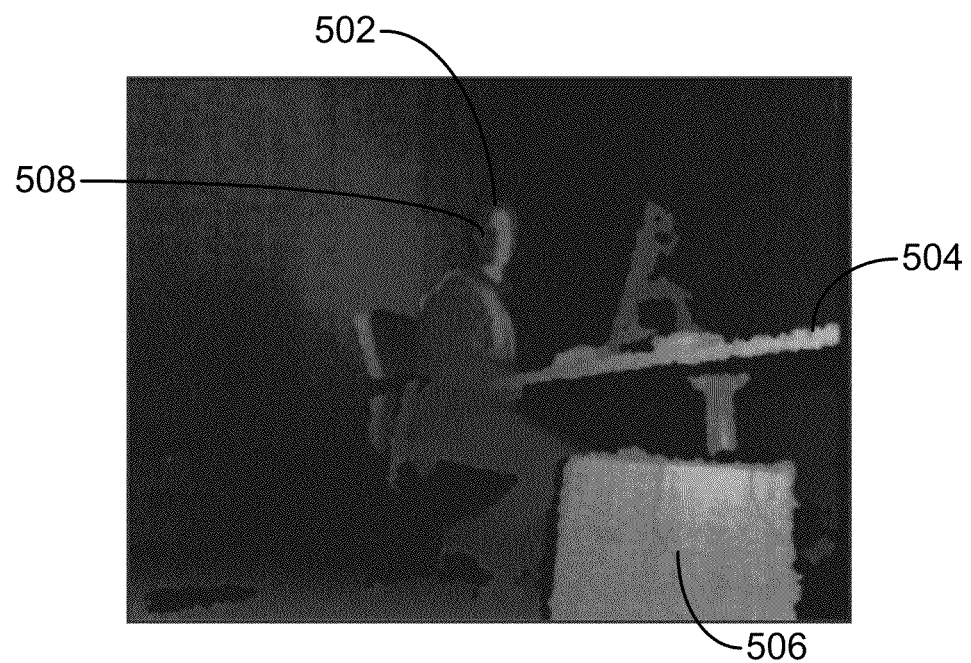
FIG. 5 is an example image generated from a depth map and available RGB data in low-light conditions.

FIG. 5 is an example image 500 generated from a depth map and available RGB data in low-light conditions. As shown, the generated image 500 includes the worker 502, desk 504, and computer 506. The image 500 may also include additional detail, such as facial features 508.

While the systems, methods and flow diagram described above have been described with respect to robots, it is to be understood that various other devices that utilize or include display technology can utilize aspects described herein. For instance, various industrial equipment, automobile displays, and the like may apply the inventive concepts disclosed herein.

What has been described above includes examples of the subject innovation. It is, of course, not possible to describe every conceivable combination of components or methodologies for purposes of describing the claimed subject matter, but one of ordinary skill in the art may recognize that many further combinations and permutations of the subject innovation are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable storage media having computer-executable instructions for performing the acts and/or events of the various methods of the claimed subject matter.

What is claimed is:

1. A robot, comprising:
    a processor executing instructions that generate an image, the processor issuing control signals corresponding to the image to be generated;
    a depth sensor that captures depth data about an environment of the robot; and
    a software component executed by the processor configured to:
        generate a depth map of the environment based on the depth data, and generate the image based on the depth map and red-green-blue (RGB) data about the environment;
        determine that an illumination level falls below a specified threshold;
        generate the image in response to determining that the illumination level falls below the specified threshold; and
        convert depth data into image data by associating color intensity with depth value, wherein depth data is represented as an illumination calculated from depth data as a gray scale image such that natural illumination is simulated according to an inverse-square relationship between the calculated illumination and the depth data.

2. The robot of claim 1, comprising a camera configured to capture the RGB data about the environment.

3. The robot of claim 1, wherein the wherein the software component is configured to send the image to a remote user.

4. The robot of claim 1, wherein the software component is configured to:
    generate a plurality of depth maps of the environment;
    capture a plurality of RGB data of the environment;
    generate a plurality of images based on the plurality of depth maps and the plurality of RGB data; and
    generate a video comprising the plurality of images.

5. The robot of claim 4, wherein the software component is configured to send the video to a remote user.

6. The robot of claim 1, wherein the depth sensor is configured to perform an infrared laser scan of the environment, and wherein the depth data is captured in response to performing the infrared laser scan.

7. The robot of claim 1, wherein the depth map is generated based on a time of flight method.

8. The robot of claim 1, wherein the depth map is generated based on a structured light deformation method.

9. The robot of claim 1, wherein the RGB data is to be calculated on a per-channel basis.

10. A mobile device, comprising:
a processor;
a depth sensor configured to capture depth data about an environment of the robot;
a camera configured to capture red-green-blue (RGB) data about the environment; and
a software component executable by the processor, the software component configured to direct the processor to:
generate a depth map of the environment based on the depth data; and
generate an image based on the depth map and the RGB data
determine that an illumination level falls below a specified threshold;
generate the image in response to determining that the illumination level falls below the specified threshold; and
convert depth data into image data by associating color intensity with depth value, wherein depth data is represented as an illumination calculated from depth data as a gray scale image such that natural illumination is simulated according to an inverse-square relationship between the calculated illumination and the depth data.

11. The mobile device of claim 10, wherein the software component is configured to direct the processor to send the image to a remote user.

12. The mobile device of claim 10, wherein the software component is configured to direct the processor to:
generate a plurality of depth maps of the environment;
capture a plurality of RGB data about the environment;
generate a plurality of images based on the plurality of depth maps and the plurality of RGB data; and
generate a video comprising the plurality of images.

13. The mobile device of claim 12, wherein the software component is configured to direct the processor to send the video to a remote user.

14. The mobile device of claim 10, wherein the depth map is generated by:
performing an infrared laser scan of the environment;
performing a time of flight method for the infrared laser scan; and
performing a structured light deformation method for the infrared laser scan.

15. The mobile device of claim 10, wherein the software component is configured to direct the processor to calculate RGB data on a per-channel basis.

16. A method for generating an image, comprising:
generating a depth map of an environment of the robot;
capturing red-green-blue (RGB) data about the environment;
determining that an illumination level falls below a specified threshold;
generating, in response to determining that the illumination level falls below the specified threshold, an image based on the depth map and the RGB data about the environment; and
converting depth data into image data by associating color intensity with depth value, wherein depth data is represented as an illumination calculated from depth data as a gray scale image such that natural illumination is simulated according to an inverse-square relationship between the calculated illumination and the depth data.

17. The method of claim 16, wherein generating the depth map comprises:
performing an infrared laser scan of the environment;
performing a time of flight method for the infrared laser scan;
and performing a structured light deformation method for the infrared laser scan.

18. The method of claim 16, comprising sending the image to a remote user.

19. The method of claim 16, comprising:
generating a plurality of depth maps of the environment;
capturing a plurality of RGB data of the environment;
generating a plurality of images based on the plurality of depth maps and the plurality of RGB data; and
generating a video comprising the plurality of images.

20. The method of claim 19, comprising sending the video to a remote user.

* * * * *